Jan. 30, 1968  R. P. DELANO  3,366,786
APPARATUS FOR PRODUCING COLOR EFFECTS
Filed April 15, 1965

INVENTOR.
RICHARD DELANO
BY Worth Wade
ATTORNEY

United States Patent Office 3,366,786
Patented Jan. 30, 1968

3,366,786
APPARATUS FOR PRODUCING COLOR EFFECTS
Richard P. Delano, P.O. Box 96,
Setauket, N.Y. 11785
Filed Apr. 15, 1965, Ser. No. 448,340
4 Claims. (Cl. 240—3.1)

ABSTRACT OF THE DISCLOSURE

An apparatus for producing constantly varying color effects on a screen. A non-planar, multi-faceted disk is rotated. One or more light sources are provided, each of the light sources moving with linear reciprocating motion and casting a focused beam to said disk. The color effect appears on a screen.

This invention relates in general to an optical device for producing variegated color effects and in particular to an apparatus for producing varied color effects without substantial repetition and to combine said effects with sound.

Various means have been suggested in the past for producing variable color effects. For example, for lighting a stage or screen a device has been used embodying a fixed light beam and a rotating transparent disc having colored segments thereon so that by rotating the disc various colors may be directed on the stage or screen. But such devices produce a single color but not variegated colors in random patterns. It has also been proposed in the prior art to take the audio out-put frequencies from a radio or electronic phonograph, divide the frequencies into three or more ranges and connect each range to activate a different colored lamp. Such electronic devices require very expensive circuits and complicated equipment for directing the resulting colors upon a screen. Furthermore, each band of frequencies produces only a single color so that the repetition of the audio frequency will result in the repetition of the color.

It is a general object of the present invention to provide a simple and inexpensive means for producing variegated colors which change in random manner without substantial repetition over a period of time.

It is a further object of the invention to provide simple and inexpensive optical device producing variant colors which may vary in intensity with the intensity of a simultaneous sound.

It is a specific object of the invention to provide a simple and inexpensive device for producing variegated color effects upon a screen without substantial repetition with time.

Other objects of the invention will in part be obvious and will in part appear hereinafter.

According to the invention, the basic elements of the optical device comprise a movable light source arranged to impinge a beam of light upon a movable nonplanar color-variegated surface and a screen upon which the variegated colors are received in random manner and without substantial repetition. In one general and preferred embodiment of the device, the movable varied-colored surface is a reflective surface and the screen upon which the colors are viewed is translucent, the viewer facing the screen on the side opposite the light source. In a second embodiment the movable varied-colored surface is transparent or translucent and the light is transmitted through such surface and received upon an opaque screen, the viewer facing the screen on the same side as the light source. In both embodiments it is a characteristic of the invention that the movement of the light beam is out-of-phase with the movement of the colored surface so that there is substantially no repetition of colors within a short time period. The movements of the light source and the colored (reflective or transmissive) surface may be achieved by a single prime-mover, such as an electric motor, the difference in relative movement being achieved by use of different gear systems or by use of gear and cam systems of conventional design, or alternatively the light source and the colored surface may be moved by separate motors provided with such gear systems that the two parts move completely out of phase so that there is no repetition of colors except after a very long period of time, if ever.

The present device may be used in a variety of ways: by an individual person or a group of persons watching the flow of colors on the screen while listening to sound in the form of music, poetry, drama or lectures; alternatively, watching the variegated colors playing upon or forming a back-drop for performing artists such as musicians, dancers and actors. The variegated color effects may be used in conjunction with animated cartoons, moving advertising elements or puppets. Photographs of pleasing color arrangements may be used as designs for wall paper and fabrics. Further, the device may be used as an adjunct or means for mental therapy in which the variable color effects are used to divert or entertain the patient or to supplement instructions from the therapist. Finally, the present system may be connected to a radio, television, phonograph or movie sound track so that the intensity of the several lamps is controlled by the electrical audio output, for example, by the use of an electrical system as shown in U.S. Patent No. 1,690,279 issued Nov. 6, 1928 or similar systems to control a transformer in the electric circuit supplying current to the lamps. Such electronic devices or systems form no part of the present invention except when used in the combination claimed.

For a more complete understanding of the nature of the invention, reference should be had to the accompanying drawings.

Figure 1A:
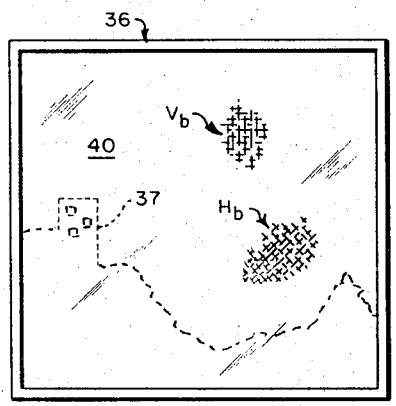
FIG. 1a is a front elevation of the cabinet of FIG. 1 showing the viewing screen.
Figure 1:
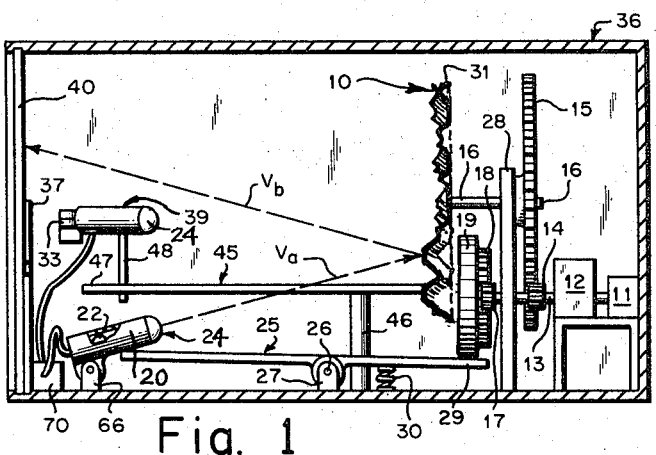
FIG. 1 is a side elevation of one embodiment of the optical device of the invention after removal of the side panel of the enclosing cabinet.
Figure 2:
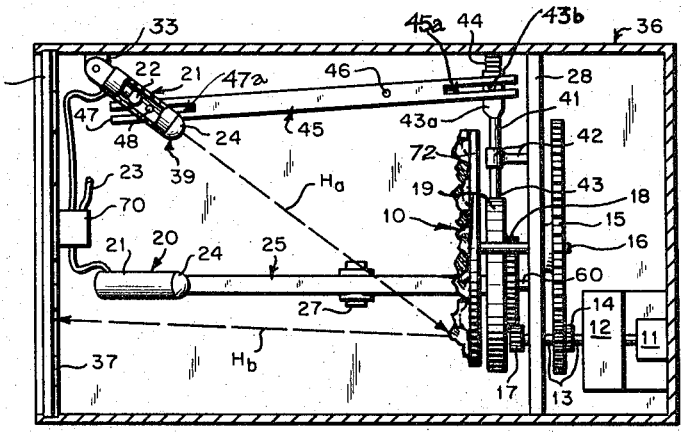
FIG. 2 is a top view partly in section, of the device of FIG. 1, after removal of the top of the cabinet housing the device.
Figure 4:
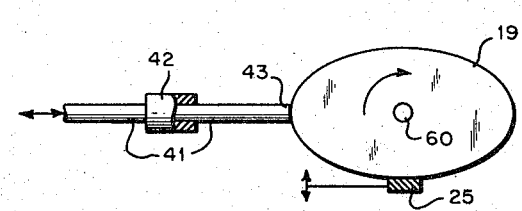
FIG. 4 is a end elevation, partly in section, of elements for imparting motion to one of the lamps.

Referring to FIGS. 1 and 2, the colored movable surface is a disc 10 which is rotated by means of a motor 11 through speed-reducing gear unit 12. The output shaft 13 of the reducing unit is provided with a small-diameter gear 14 positioned to mesh with a larger gear 15 mounted on one end of shaft 16 the other end of which is attached to the colored disc 10 at its center or preferably off-center, that is, eccentric. The gear train thus described is such that the disc 10 is caused to rotate slowly, for example, making one revolution in from 1 to 5 minutes, preferably one revolution in 3 minutes.

The output shaft 13 of the gear-reduction unit 12 is also provided with another small gear 17, of different diameter from that of gear 14. Gear 17 is arranged to mesh with a larger gear 18 to which is affixed a cam 19.

A light beam is produced by a projection lamp 20 comprising a tubular casing 21 in which is mounted an electric bulb 22 supplied with current from the line 23. The light beam from the bulb 22 passes through a semi-spherical lens 24 (see detail in FIG. 2), so as to focus on the disc 10 a small spot of light which travels along the path Va, is reflected by the disc 10 and travels along the path Vb to the screen 40. A vertical up-and-down motion is imparted to the lamp 20 by means of a rod 25 pivoted by means of a pin 26 rotatably supported on a mount 27 fixed to the base of the cabinet 36. One end of the rod 25 contacts the underside of the lamp 20 and the other end 29 is positioned to contact the outer edge of the cam 19 being held against such cam be means of the expansion spring 30. The cam is so configured that as it is rotated the lamp 20 will be caused to rise and fall so that the spot of light will sweep from the lower edge to top edge of the disc 10. Preferably the lamp 20 is so positioned that the spot of light sweeps over one-half of the disc and at a slight angle to the vertical surface thereof, as shown in FIG. 2. The gear train is so designed that the sweep of the light beam over the disc will require 1–10 minutes, preferably 5 minutes and in all events the sweep is out of phase with the speed of rotation of the disc 10 so that there will be no substantial repetition of pattern.

Figure 3:
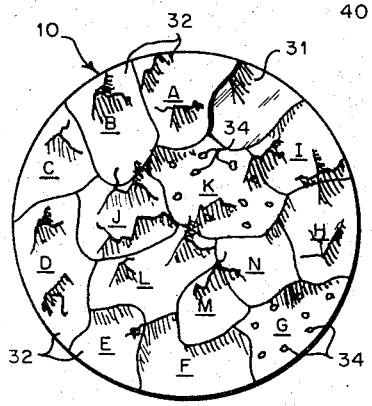
FIG. 3 is a front elevation, partly in section, of the movable colored disc.

Referring to FIGS. 1 and 3 it will be noted that the face of disc 10 is nonplanar, that is, it has an abstract and irregular three-dimensional shaped surface thus producing a nonuniform surface. In that embodiment shown in FIGS. 1 and 2 the disc 10 is mounted on the end of shaft 16 which is rotatably mounted on the support 28. In the preferred embodiment the disc as shown in FIG. 3, is reflective and comprises a thin solid backing 31 made of highly polished reflective metal, or a plastic or glass, having a mirrored surface. The reflective backing 31 is provided with a coating or film 32 comprising a variety of colors arranged in an abstract pattern. For example, small pieces marked A to N of colored transparent film may be adhesively mounted on the backing 31 so that different segments or parts of the disc have different colors or shades of color. In addition some areas such as areas G and K of the transparent coating or film 32 may be provided with opaque particles 34 which are reflective, such as pieces of tinsel or sequins. If the disc is to be transparent, as in embodiment shown in FIG. 5, these particles may be translucent or opaque but need not be reflective. To affix the particles certain areas such as G and K of the disc 10 is covered with a wet or tacky adhesive and the particles scattered thereon in random manner and the adhesive hardened.

The three-dimensional surface of the disc 10 can be produced by beating it in a haphazard manner or by crinkling it after which, if the backing is flexible and deformable; or by molding the backing with an irregular surface if rigid. From such master discs, other discs can be produced by making a mold of the master and shaping other disc to its abstract shape.

It should be understood that a plurality of lamps may be used in the present device. If more than one lamp is used at least one other lamp should be arranged and positioned so that its light beam sweeps across the disc 10 at an angle to the sweep of the first lamp 20 above described. Referring to FIGS. 1 and 2, there is shown a second lamp 39 having a casing, bulb and lens similar to the lamp 20.

The beam from lamp 39 is arranged to sweep or reciprocate over the surface of the disc 10 in a horizontal plane. Lamp 39 is pivotally supported on a side wall of the cabinet 36 on a mount 33 and also positioned so that its beam along path Ha contacts the disc 10 at a small angle and is then reflected along Hb upon the screen 40. The reciprocal movement may be imparted to lamp 39 by means of a cam-follower rod 41 arranged to reciprocate in the sleeve 42, with one end 43 of the rod contacting the curved edge surface of the cam 19. The rod is pressed against the cam by means of the expansion spring 44. The sleeve 42 is affixed to side of the disc support 28 (see FIG. 2). The end 43a is freely linked to a second rod 45 by means of the pin 43b sliding in the groove 45a of the rod 45. The rod 45 is freely pivoted on the post 46 with the end 47 movably linked by means of the slot 47a and a pin 48 depending from the base of the lamp 39. As the cam 19 rotates the lamp 39 is reciprocated in a horizontal plane so that its light beam sweeps back and forth across the disc 10.

It will be noted that the rod 41 contacts the cam 19 at a point different from the contact point of the rod 25 so that the movement of the two lamps is out of phase, that is, when the beam from lamp 20 is elevated the beam from the lamp 39 is crossing the right half of the disc so that the two beams do not contact the same sector of the disc at the same interval.

The light beams are reflected from the disc 10 and impinge on the surface of a translucent screen 40, the spectators viewing the colors from the side of the screen 40 opposite from that facing the disc 10 (see FIG. 1). The entire device shown in FIGS. 1, 1a and 2 may be encased in a suitable container such as a cabinet 36 of which the screen 40 forms part or all of one of the walls.

Opaque "cut-outs" 37 may be positioned near the inside of the screen 40 to prevent the viewer from seeing the lamps and mechanical parts of the device and to provide decorative effects.

Figure 5:
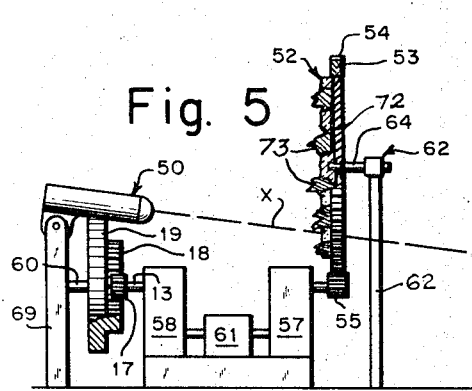
FIG. 5 is a side elevation of a second embodiment of the optical system of the invention.

In that embodiment shown in FIG. 5 the same means may be used for reciprocating the lamps 50 and others not shown as used for reciprocating the lamps 20 and 39 of the embodiment of FIG. 1. In this second embodiment the disc 52 is made of transparent plastic or glass but is otherwise colored in a variegated manner and by the same means as used in coloring the disc 10. Disc 52 also has a nonplanar irregular surface like disc 10. In this embodiment the disc 52 may be rotated by means of outer ring 53 provided with teeth 54 meshing with a small gear 55 mounted on the shaft 56 protruding from the gear-reduction unit 57. The disc 52 is mounted on a rod 64 rotating freely in the journal 62 on top of the support 62a. The lamp 50 may be given a vertical up and down movement by means of a reduction gear 58 driven through the motor 61. From the gear box 58 the shaft 31 carries a small diameter gear 17 meshing with a large diameter gear 18 to which is welded a cam 19, both the cam and gear 18 being rotatably mounted on the shaft 60 extending from the support 69. The lamp 50 is pivotally mounted on top of the support 69 so that its under surface contacts the curved edge of the cam 19 which causes the lamp to rise and fall. The beam of light passes along the path x through the transparent disc 52 and impinges upon a distant opaque (reflective) screen 58. The screen 58 which may be a small screen such as that used for the projection of home colored slides or movies; or screen 58 may be a large theatrical screen in a theatre. The spectators face in the same direction as the direction in which the light is projected.

The various gears have been shown as having substantial thickness but this is for illustration only since the large gears may be merely sheet metal with teeth formed in the edge by making slots therein.

When it is desired to correlate the color effects with sound effects from an audio speaker of a radio, television or movie sound tract, the audio output from such electronic devices is connected to a transformer 70 in the electric line 23 which supplies current to the lamps 20 and 39. By such connection, the intensity of the light will vary with the intensity of the output of the loudspeaker of such devices.

While many variations can be made in the invention as described it is not to be limited except as specified in the appended claims.

For example, in FIG. 2, the variegated colored irregular plastic disc 10 may be adhered to a planar disc 72 of reflective material, such as a mirrored glass disc. In the embodiment shown in FIG. 5 the disc may comprise a mosaic of irregular shaped pieces 73 of plastic material of different color adhered to a disc 72 of transparent plastic or glass.

What I claim is:

1. Apparatus to produce varying colored effects on a screen, comprising
   (1) a light source and lens assembly fixed relative to each other, and means to move said light source and lens system in linear reciprocating motion at a fixed rate,
   (2) a rotatable disk having a multi-faceted, irregular, non-planar, varying color surface, said disk being positioned to intercept said beam of light from said light source and lens system, and means to rotate said disk at a fixed rate, said means to rotate said disk having a speed relative to the speed of said means to move said light source and light system to provide that the cycle of rotation of said disk is out-of-phase with the cycle of reciprocation of said light source and lens system, and
   (3) a screen provided in fixed position relative to said disk and positioned close enough to said disk so that said light beam from said light source and lens system, after impinging on said disk, casts a visible light pattern on said screen.

2. An apparatus as set forth in claim 1 wherein said means to move said light source and lens system comprises a lever pivoted only in one plane, and said light source and lens assembly is also pivoted or motion only in the same plane as said lever, and said lever operatively contacts said light source and lens assembly to move it, and said lever is also operatively connected to and movable by a motor means.

3. An apparatus as set forth in claim 2 wherein two light source and lens assemblies and levers are provided, one said lever and one said light source and lens assembly each being pivoted for motion in a first plane, and the second said light source and lens assembly and the second said lever each being pivoted for motion in a plane at right angles to said first plane, and each of said levers is operatively connected to a motor means.

4. An apparatus as set forth in claim 3 wherein said motor means is an electric motor, and said means to rotate said disk includes speed reduction means operatively connected between said motor and said disk, and means to move said levers includes an eccentric cam operatively connected between said electric motor and each of said levers, each of said levers operatively bearing against said cam at a different place on the periphery of said cam.

References Cited

UNITED STATES PATENTS

| | | | |
|---|---|---|---|
| 1,406,663 | 2/1922 | Lovstrom | 240—3.1 |
| 1,794,886 | 3/1931 | Durham | 40—106.52 |
| 1,800,054 | 4/1931 | Craig | 40—130 |
| 3,242,330 | 3/1966 | Schoffer | 240—3.1 |

FOREIGN PATENTS 256,938   3/1927   Great Britain.

NORTON ANSHER, *Primary Examiner.*

M. H. HAYES, *Assistant Examiner.*